June 25, 1968        D. VICINI        3,389,433
AUTOMATIC FEED METERING DEVICE FOR INJECTION MOULDING MACHINES
Filed Oct. 23, 1965        3 Sheets-Sheet 1
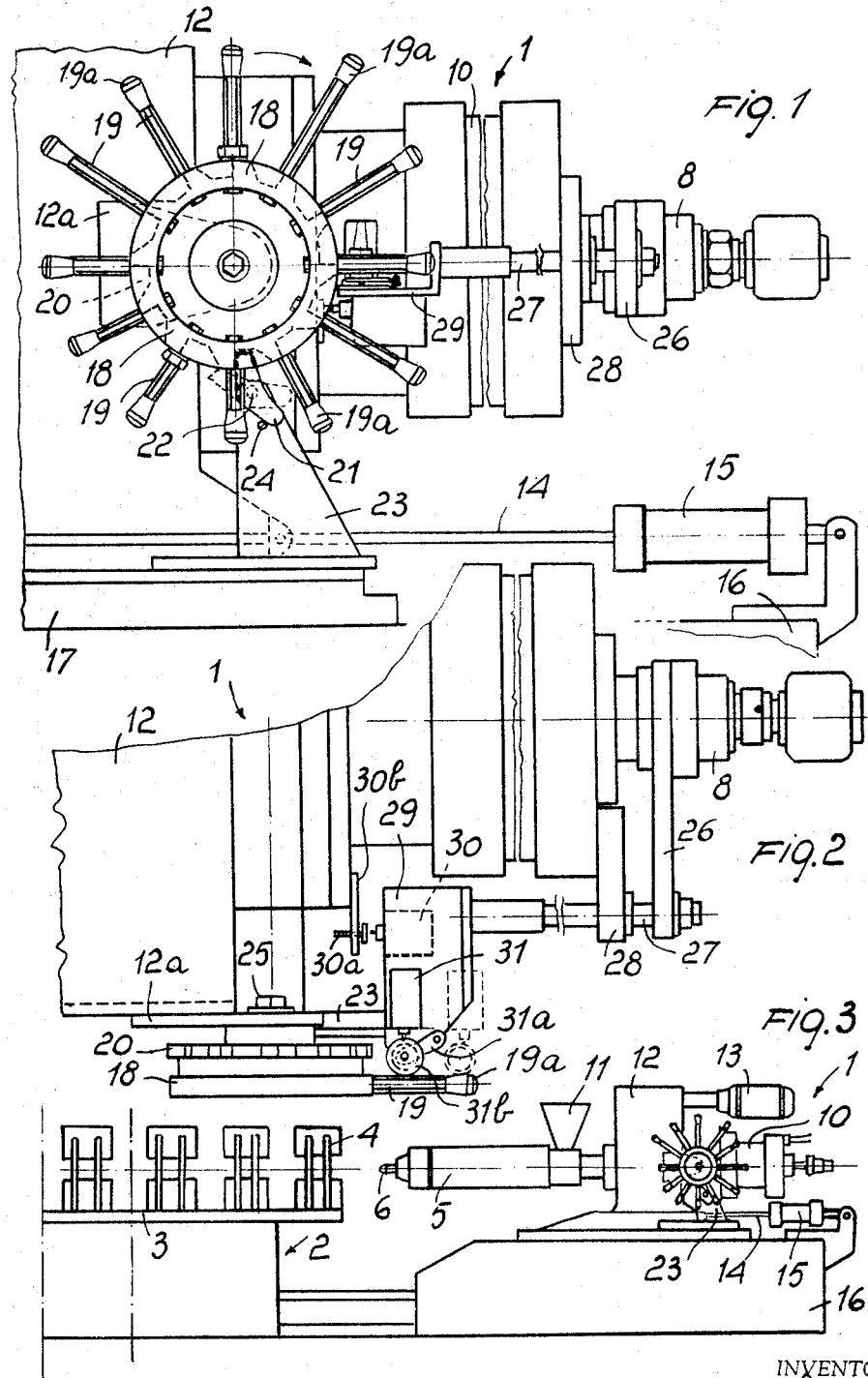
INVENTOR.
Dino Vicini
BY
Agent INVENTOR.
Dino Vicini
BY
Agent

United States Patent Office 3,389,433
Patented June 25, 1968

3,389,433
AUTOMATIC FEED METERING DEVICE FOR INJECTION MOULDING MACHINES
Dino Vicini, Milan, Italy, assignor to M.A.S. Hydraulic and Vulcanizing Machinery Co. S.r.L., Milan, Italy, a corporation of Italy
Filed Oct. 23, 1965, Ser. No. 503,616
Claims priority, application Italy, Feb. 9, 1965, 2,724/65, Patent 751,564
7 Claims. (Cl. 18—30)

ABSTRACT OF THE DISCLOSURE

This disclosure relates to an injection moulding machine including an injection unit and a plurality of movable moulds, wherein the moulds are alternatively brought in the reach of the injection unit and wherein the injection unit has a cylinder and a piston by means of which the filling and the injection operations are performed and wherein the injection unit may be moved towards and away from the moulds. The machine comprises limit switches controlling the movement of the injection unit and the filling thereof.

Figure 4A:
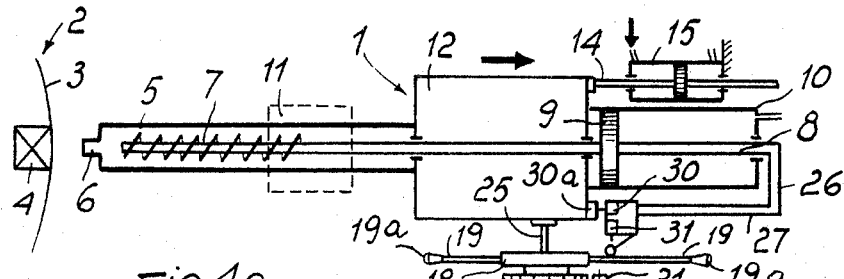
Figure 4B:
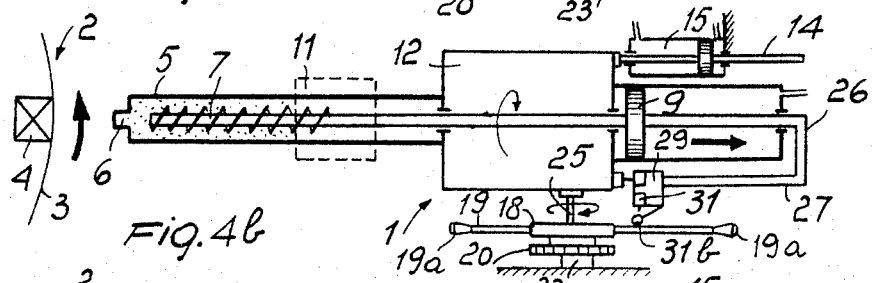

The present invention relates to an automatic feed metering device to be connected to injection machines having a plurality of moulding stations, for moulding natural or synthetic resin articles, and more particularly for moulding soles and shoes.

It is known that for the manufacture of shoes and soles of rubber or other natural or synthetic resins, by means of an injection moulding, screw feeder injection units are used, in which the material quantity for each injection has to be metered or proportioned in relation to an average quantity depending upon the production which is planned.

This system is however affected by the drawback that for the larger sizes, i.e. for soles or shoes having a bigger "number" (size), the quantity of the injected material appears to be insufficient to fill completely the moulds, so that reduced thickness are obtained with respect to the sizes of the moulds or, in certain cases, defects or misformations of the shoes occur (with consequential waste and price increase).

For the minor sizes a waste of material occurs, which adversely affects the manufacture prices in these cases too.

This wastage may reach remarkable values if, in order to have always the complete filling of the moulds, the metering of the feed is made to relate to the larger sizes.

It is a principal object of this invention to obviate the above mentioned drawbacks, providing a regulation and control device which is capable of permitting the admission in the moulds of the exact quantity of material which is respectively required by the size and the shape of the soles or of the shoes to be manufactured.

Another important object of the invention is to provide a device, the working of which is reliable, which is of practical operation and easy and quick in adjustment.

These and other objects are reached by the automatic metering device according to the invention, particularly for injection moulding machine of the class having a plurality of stations or having a continuous cycle, to be connected to the injecting unit mounted so as to be displaceable by means of a slide on a structure which is radially arranged along the profile of the rotatable plate carrying the moulds and is characterized in that it comprises a rotatable member provided of a plurality of measuring rods mounted to radially project, and having an equal angular distance between each other, on the periphery of said rotatable member, which rods are provided with limit stops for operating at least a microswitch in the electrical circuit for controlling the turning of the feeder screw of the injection unit, said rotatable member being mounted so as to be displaceable, as far as a rotation fraction at each operation is concerned, upon the direct control derived from the operative displacement of the injection group, said microswitch being actuated by said measuring rods, when the relative displacement occurs between said injection group and the control piston rods connected to said feeder screw during the step in which the material is fed in the injector, with consequent backwards movement of the feeder screw.

Further features and advantages of the invention will better appear from the detailed disclosure of a preferred embodiment (which is not for limiting purposes) of an automatic metering device according to the invention, which in the accompanying drawing is illustrated for an indicative purpose only and without being restricted thereto.

Figure 5:
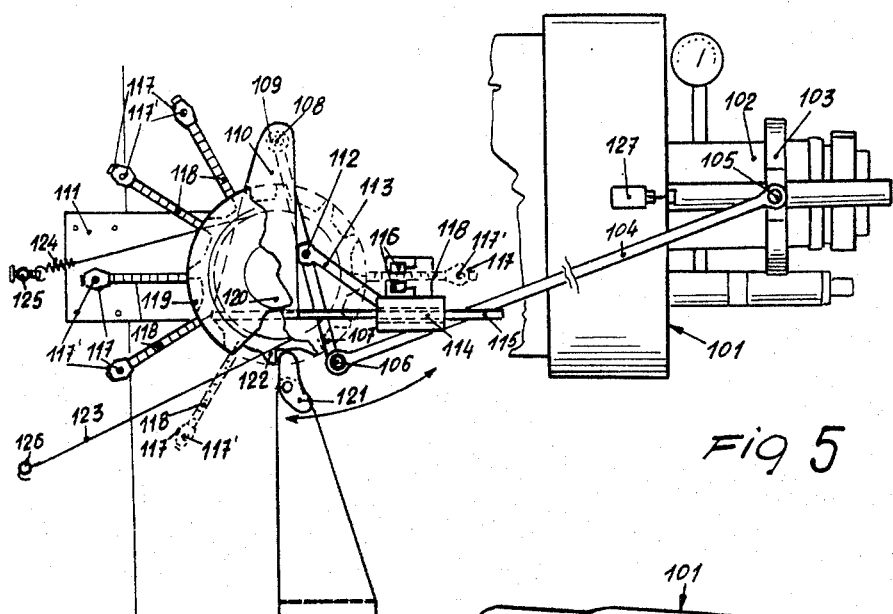
Figure 6:
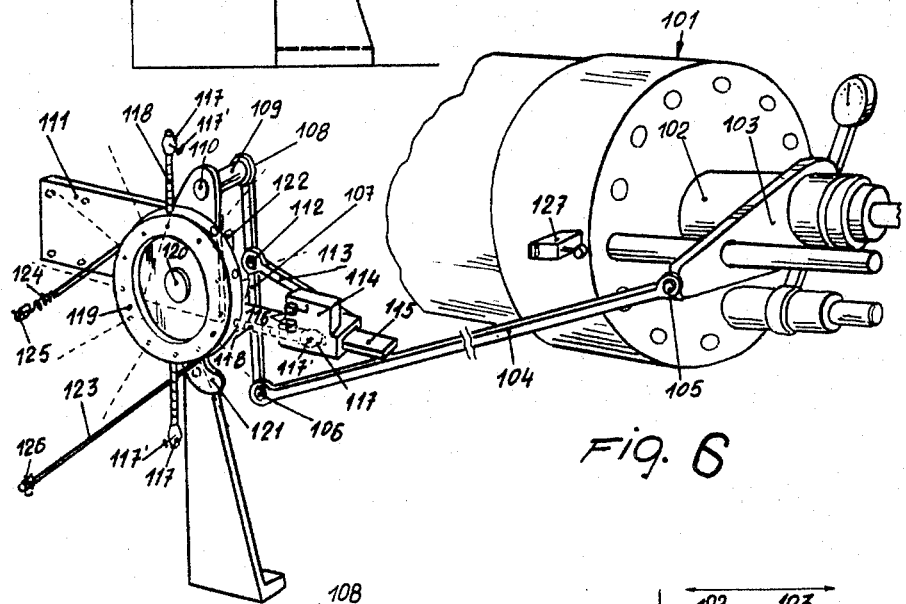
Figure 7:
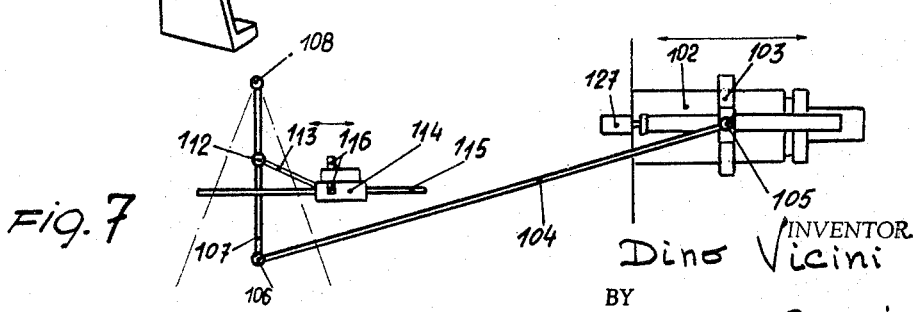

In said drawings:
FIG. 1 is a lateral view of a part of the injection unit, provided with the metering device according to the invention;
FIG. 2 is a view from the top of the part of the machine shown in FIG. 1;
FIG. 3 shows diagrammatically in lateral view an injection moulding machine of the class having a plurality of stations, working in a continuous cycle, which is provided with a device according to the invention;
FIGS. 4a, 4b, 4c, 4d and 4e show a diagram of the injection moulding machine provided with the device according to the invention, in respectively successive working positions;
FIG. 5 is a diagrammatic frontal view of another embodiment of the metering device, with a mechanism for reducing the stroke of the injection piston;
FIG. 6 shows a perspective view of the embodiment of FIG. 5;
FIG. 7 shows a diagram of the mechanism for reducing the injection piston stroke.

Referring now to these figures, the automatic metering device according to the invention is applied to an injection moulding machine of the type having a plurality of stations operating in a continuous cycle and more precisely to the injection unit 1 which is radially arranged with respect to the part 2 of the machine (FIG. 3) which comprises the rotatable plate 3 carrying the moulds 4.

The injection unit 1, according to a per se known arrangement, comprises the injector 5 (ending with a nozzle 6) within which is rotatably mounted a feeder screw 7 capable of axial displacement, said screw being rigidly connected to the rod 8 of the piston 9 of the main operative cylinder 10. The injection unit comprises furthermore a feeding hopper 11 and a head 12 containing the gears and control means for transmitting the movement from an electrical motor 13 to said feed screw 7; the head 12 is connected externally with respect to the rod 14 pertaining to a double-acting cylinder 15 for control of the displacement of the injection unit with respect to the base 16. The whole injection unit is indeed mounted so as to be able to be displaced with the aid of a slide on the guide 17 rigidly connected to the base 16, so that the injector 5 may be axially displaced towards a position near or remote, with respect to the rotatable plate 3; to this end the rod 14 of the cylinder 15 is connected to the head 12, while the body of the cylinder 15 is connected by articulation means through the base 16.

According to the present invention, to the head 12 a wheel or other rotatable body 18 is connected by means of a carrying member 12a, said wheel or the like being provided, on its periphery, with measuring rods 19. Said wheel 18 is mounted so as to rotate along an axis which is substantially horizontal and perpendicular to the axis of the injector, while said measuring rods 19 are radially mounted at equal angular spacing between each other and are provided with a threaded body which is capable of being screwed in corresponding holes in the wheel 18. The end portion 19a of said rods 19 have an enlarged form of substantially truncated-cone shape.

The wheel 18 is rigidly connected to a toothed coaxial wheel 20, whose teeth is in the form of a saw tooth shape, capable of engagement with a pawl 21, rotatably mounted in 22 (FIG. 1) on a bearing bracket 23 rigidly connected to the base 16, said pawl 21 having an angular shape substantially in the manner of a lever, one end of which is adapted to be engaged with the teeth of the toothed wheel 20 and the other end being capable of engagement with a stationary pin 24, projecting from the bracket 23.

The wheels 18 and 20 are mounted for rotation around shaft 25, having a cantilevered projection from the member 12a, their rotation being controlled by a friction joint, a release device, a free wheel or the like, not shown.

The arrangement of the toothed wheel 20, to each tooth of which a measuring rod 19 corresponds, is chosen in such a manner that at each return stroke of the injection unit an angular displacement occurs so that the rods 19 are progressively brought into operative position by the action of the pawl 21 on the teeth of the wheel 20, as will be better disclosed hereinafter.

In the drawings, the wheel 18 is provided with twelve radial rods 19, since the device is supposed to be applied to a moulding machine having twelve mould carrying stations 4, arranged on the rotatable plate 3, but it is manifest that the number of the rods 19 may vary according to the type of the machine taken into consideration.

To the rod 8 of the piston 9 an arm 26 is secured, which arm is arranged orthogonally with respect to the rod itself and carries a rod 27 parallel to the axis of the cylinder 10 and slidable on the side of this cylinder in a hole machined in the guiding arm 28 rigidly connected to the same cylinder 10. The end of rod 27 which is opposite to the end which is connected with the arm 26, carries a plate-shaped member 29 which in turn carries two microswitches 30 and 31. The first of said microswitches 30 is brought into action by an adjustable screw 30a mounted on a projection 30b which is rigidly connected to the head 12, while the other microswitch 31 is brought into operation by a lever 31a, which is rotatably mounted on the plate-shaped member 29 and carries towards the external direction, a roller or the like 31b. Said roller 31b assumes a position which is in the range of the rods 19 which progressively are brought in the horizontal position shown in FIG. 1.

The working of the automatic metering device is the following:

For clarity sake, the operative cycle is described in a complete manner with the aid of the diagrams from FIG. 4a to FIG. 4e, on which arrows show the main movements. The step shown in FIG. 4a relates to the backwards stroke of the injection unit 1 towards the rear stroke end position. In order to carry out this step, the working oil controlling cylinder 15 is put in operation. At the end of this backward stroke, the toothed wheel 20 gets in engagement with the pawl 21 carried by bracket 23; said pawl 21 gets in the position as is shown by the full line in FIG. 1, i.e. it adheres to the pin 24, so that a stationary stop is formed by its upper end. This latter end comes in engagement with the teeth of the wheel 20 in such a manner as to cause said wheel to clockwise rotate.

The rotation of the wheel 20 and that of the wheel 18 connected thereto occurs each time along a twelfth of a turn, so that the rod 19 in engagement with the roller 31b is replaced by an immediately successive rod. In the same operative step, a stroke end stop (limit stop) not shown imparts the rotation actuation to the feeder screw 7 and simultaneously the rotation actuation for the rotatable plate 3 so that the mould carrying station 4, which is ready to receive the injection, is brought at the range of the injection unit.

Figure 4C:
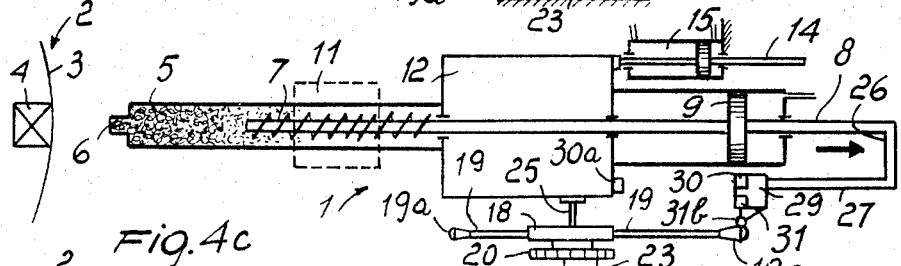

Rotation of feeder screw 7 brings about the feeding step which occurs with a backwards movement of the feeder screw itself and that of the rod 8 (FIG. 4c).

When the rod 8 is displaced, the plate shaped element 29 is also displaced since it is rigidly connected with said rod through the rod 27 and through arm 26, so that the roller 31b slides on the body of the measuring rod 19 until it gets into engagement with the enlarged end 19a thereof. At this point, as a consequence of the displacement of the roller 31b actuation of the microswitch 31 occurs, which actuates the stopping of the feed screw rotation.

Figure 4D:
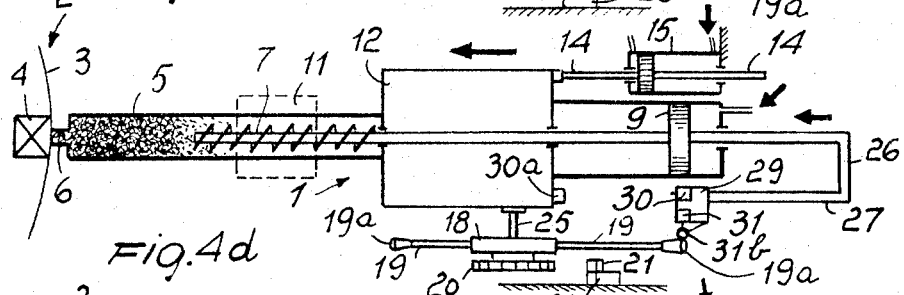

The measuring rods 19 are arranged so as to have a convenient length, which may be adjusted by screwing operations of the same on the wheel 18 or by replacing them by analogous rods having other lengths, so that the stopping of the rotation of the feeder screw 7 depends upon the length of the rod 19 coming into engagement with microswitch 31. This microswitch, besides stopping the feeder screw 7, transmits a forward motion actuation to the injection unit by admission of oil into the cylinder 15 (FIG. 4d).

The injector 5 advances at this point until the nozzle 6 is in engagement with the mould 4; the stopping which occurs as a consequence of the engagement between moulds 4 and nozzle 6 brings about a pressure increase in the compression conduit of the cylinder 15 and since to said conduit a pressure gauge (of the type aimed at transmitting an electrical pulse when a maximum set pressure is attained) is connected, it is ensured that when a pre-established pressure value is obtained, the starting pulse for the injection is given.

The charge of rubber or other material enclosed in the injector 5 is then sent, through the nozzle 7, to the moulds 4.

Figure 4E:
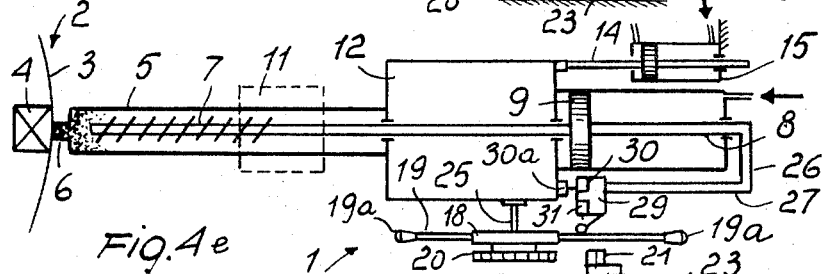

The position of FIG. 4e is now reached, according to which the feeder screw 7 and the rod 8 have been displaced in forward direction, causing the plate-shaped element 29, carrying the microswitches 30 and 31 to effect an analogous displacement. The switch 30 is then actuated by the adjustable screw 30a and hence the backward movement actuation of the injection unit follows, which latter assumes the positions already shown in FIGS. 4a and 4b.

The toothed wheel 20, which disengaged itself from the pawl 21 during the forward motion of the injection unit (FIGS. 4d and 4e) returns in engagement with the same (FIG. 4b) and a further rotation of wheel 18 occurs, with consequent positioning of the successive measuring rod 19. The steps are then repeated in a manner which is similar to that hereinabove disclosed.

It is thus possible to carry out everytime injections which are conveniently metered in relation with the sizes of the moulds 4 which successively come into the range of the injector 5 as a consequence of the rotation of plate 3.

Obviously, alternative embodiments of the invention may be carried out. Thus for example the actuation means for the device may be mounted in a reverse arrangement, connecting the wheel 20 to the rod 8 and the microswitch 31 to the head 12.

A major modification is embodied in the device shown in FIGS. 5, 6 and 7, which aims at providing the inventive features also in those cases in which the stroke of piston 9 has larger values, which compels to use measuring rods which are remarkably long.

The constructive modification shown in FIGS. 5, 6 and 7 allows the piston stroke to be reduced and the size of the measuring rods to be shortened.

Referring more particularly to these figures, the device provide a cylinder head 100 in which the injection piston is operating, the end of which has been diagrammatically shown in 102. At said end, through a collar 103 a connecting rod 104 is linked through a pivot 105 on the collar 103. The other end of the connecting rod 104 is pivoted in 106 to the end of a lever 107 secured in a rotatable manner in 108 to the pivot 109, projecting from plate 110, which, with the aid of its portion 111, is secured to the frame of the machine.

From the intermediate position of the rod 107, by means of a pivot connection shown in 112 a rod 113 is branched off, which controls the slide 114 mounted in guided relationship on the guide rail 115, secured to the machine frame. On the slide 113 a microswitch 116 is arranged, which microswitch is in the electrical circuit which controls the forward movement of the feeder screw for the injection of the material in the moulds.

The actuation of the microswitch 116 occurs when this switch, displaced on the guide 115, reaches a position corresponding to the stroke end stop (limit stop) 117 carried on the end of radial rods 118 mounted on the wheel 119 which is rotatable on the shaft 120 and which forms the essential part of the metering device.

The displacement of the wheel 119 occurs to the pawl, which is engaged in the toothed wheel 122 rigidly connected through the wheel 120, imparting to the same, in a manner which is synchronous with respect to the mould-carrying plate, a forward motion which brings about the positioning in front of microswitch 116 of a rod 118, the stroke end stop (limit stop) 117 of which is set in the correct position for the required metering as far as the corresponding mould is concerned.

It is convenient to have the stroke end stops 117 formed of small sliding bushes mounted on the rods 118, the surface of which may be graduated, and which are provided with screws 117' for selling the desired position. In order to have the displacement of the wheel 119 more precisely effected, on a cylindrical portion of the wheel 119 a friction means is provided, formed of a metallic band 123, with the interposition of a spring 124, which is secured to the points 125 and 126 rigidly connected to the frame of the machine.

As it may be clearly seen more particularly from FIG. 7, the illustrated device permits a metering device to be brought about, in which the rods 118 may be kept within acceptable size with respect to the general sizes of the machine, since the effective stroke of the piston is reduced to the desired value by arranging the connection 112 of the rod 113 in a point of the lever 107, which may be conveniently chosen.

The operative cycle of the metering device is completed also by the microswitch 127, which is actuated by the collar 103 when the piston effects its operative movement in the backward direction returning within the cylinder 101.

Finally, according to an alternative embodiment, the microswitch 116 and the respective stroke end stop (limit stop) 117 provided on the rods 118, may be replaced by photo electrical cells, the constructional features of which are per se known in the art and are outside the present invention.

I claim:

1. An injection moulding machine, comprising a rotatable plate carrying a plurality of moulds; a guide radially arranged with respect to the profile of said rotatable plate; a slide mounted in guided relationship on said guide; an injecting unit including a feeder screw, on said slide and movable therewith along said guide; a rotatable member mounted in turning relationship on said injection unit; a plurality of measuring rods mounted on said rotatable member to radially project therefrom at an equal angular spacing between each other; limit stops on said rods; a microswitch arranged in the range of said limit stops, said microswitch controlling the rotation of said feeder screw; an engagement means on said guide; a counterengagement means on said rotatable member; means for permitting said rotatable member to successively rotate only for a fraction of a turn corresponding to said angular distances between said measuring rods, said engagement means being arranged in the path of said counterengagement means thereby to engage said counterengagement means and cause an angular displacement of said rotatable member, when said injection unit is moved along said guide away from said rotatable plate.

2. An injection moulding machine, as claimed in claim 1, wherein said engagement and counterengagement means comprise a toothed wheel and a pawl, one of these members being connected to said rotatable member and the other being connected as part of the machine rigidly connected to said guide.

3. An injection moulding machine as claimed in claim 1, wherein said measuring rods have threaded end portions for screw connection with said rotatable member.

4. An injection moulding machine as claimed in claim 1, wherein said injection unit comprises a main operation cylinder with a cylinder rod connected to said feeder screw, said microswitch being connected to an auxiliary rod connected to said cylinder rod.

5. An injection moulding machine as claimed in claim 4, comprising a slide member, guides for said slide member mounted on said machine frame and extending in a direction which is parallel to one of said measuring rod when it is in its operative position, a microswitch secured to said slide member, a lever, one end of which is pivoted on a pivot on said machine frame, a linking rod for linking said slide to an intermediate point of said lever, a link rod one end of which is connected to one other end of said lever and the other end of which is connected to the injection piston of said injection unit.

6. A machine as claimed in claim 1, comprising sleeves mounted on said measuring rods and set screws for setting the position of said sleeves on said measuring rods, so that the front end of said sleeves form said limit stops for said microswitch.

7. A moulding machine as claimed in claim 1, comprising a main operation cylinder, and two microswitches connected to the main operation cylinder rod, one microswitch being arranged at the range of one of said measuring rods, and the other being arranged at the range of an adjustable screw connected to a head portion of said main operation cylinder, motor means for controlling the rotation of said feeder screw and the second microswitch being in the electrical circuit comprising means for causing said injection unit to effect its reverse stroke out of the range of a respective mould.

References Cited

UNITED STATES PATENTS 2,885,734  5/1959  Wucher.
3,146,287  8/1964  Kleine-Albers.
3,310,839  3/1967  Son et al.

WILBUR L. McBAY, *Primary Examiner.*